April 18, 1933.     C. J. MANUEL     1,904,492
BOURDON LEVER TYPE OF PRESSURE GAUGE
Filed July 10, 1928
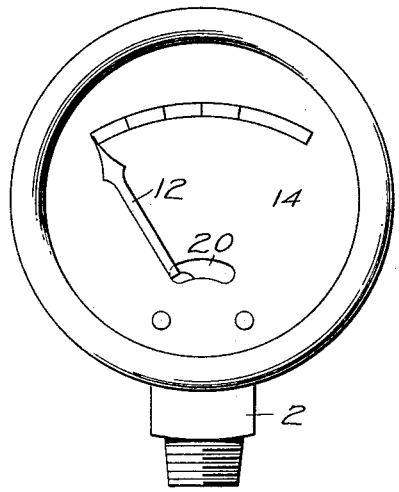
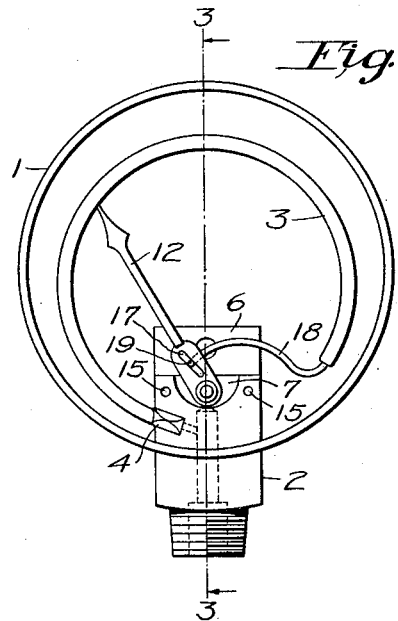
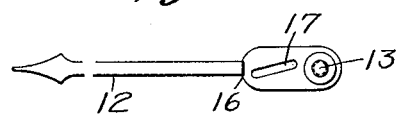
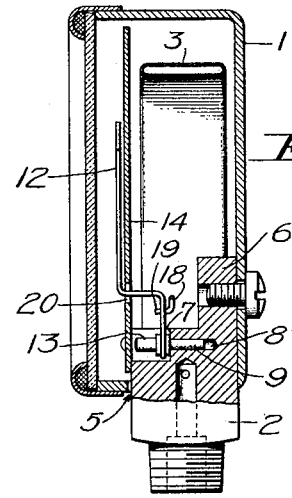
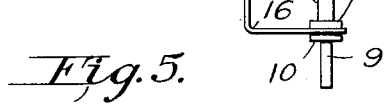
Inventor
Charles J. Manuel
By Attorneys
Nathan & Bowman Patented Apr. 18, 1933

1,904,492

UNITED STATES PATENT OFFICE

CHARLES J. MANUEL, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

BOURDON LEVER TYPE OF PRESSURE GAUGE

Application filed July 10, 1928. Serial No. 291,552.

This invention relates to an improvement in pressure gauges and the method of calibrating the instrument. Another important feature is the manner of mounting the pointer in its bearings, whereby there will be the minimum amount of friction and at the same time the parts will be best adapted for use in that type of pressure gauge employing a Bourdon tube as the means of transmitting motion to the indicator. Another feature is that the parts of the instrument are constructed in a way to make them adapted for use with Bourdon tubes that are of different lengths.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views thereof:—

In the drawing Figure 1 is an elevational view of the exterior of the instrument. Fig. 2 is a similar view of the interior of the instrument with the dial plate removed. Fig. 3 is a central vertical section on line 3—3 of Fig. 2. Figs. 4 and 5 are detail views of the pointer.

The casing for the instrument is marked 1 and the coupler is marked 2. The Bourdon tube is 3, and one end of the tube 3 is inserted in a notch 4 formed in one of the side walls of said coupler 2 and in this way the tube is securely anchored to the coupler. In this type of gauge it has been customary to form a passage within the coupler connecting with the Bourdon tube so that there will be a continuous passage from the source of liquid whose pressure is to be measured to the Bourdon tube which will expand and contract as the pressure increases or decreases. As shown in Fig. 3 there is considerable clearance between the wall of the coupler and the edges of the casing 1 as indicated at 5, and this permits the assembled coupler to be tilted to a position which enables it to be readily removed from the case, and in assembling the coupler and its associated parts within the case, it is only necessary to insert the screw threaded end into the opening at 5 while holding the unitary structure in a tilted position, then sliding the parts downwardly until the free edge of the dial clears the outer edge of the case, when the parts can be readily positioned within the case.

The coupler has one end screw threaded to permit it to be connected in any usual way with the receptacle containing the liquid whose pressure is to be indicated. This coupler 2 is also formed with a flange 6 which has a screw threaded opening to permit the coupler to be securely attached to the case 1. The coupler is also formed with a recessed seat 7, which is preferably semi-circular in shape (Fig. 2). This semi-circular seat has therein an opening 8 which forms the journal bearing for the arbor 9.

This arbor 9 is preferably formed with a shoulder 10 (Fig. 5), and the journal on one side of said shouder fits within said bearing 8, the length of the journal being less than the length of the bearing as indicated in Fig. 3 to afford clearance and avoid friction. The part adjacent said shoulder 10, which projects in the opposite direction from said journal constitutes the bearing 11 for the pointer 12 which is thereby securely fastened to said arbor. The part 13 of said arbor projects beyond the bearing 11 and is adapted to abut against the dial plate 14, which is secured to the coupler 2 by screws inserted in the openings 15.

The shoulder 10 of the arbor positions the arbor in its relation to the bearing 8 and the parts are so proportioned that the distance of the bottom of the dial plate 14 to the bottom of the recessed seat 7 is greater than the distance from the bottom of shoulder 10 to the top of the arbor so that normally the arbor will assume a position such that the shoulder 10 will rest upon the seat 7 and the top of said arbor will be out of contact with said dial plate. Clearance is shown between the end of the arbor and the end of the bearing 8. But the arbor can readily oscillate into a position such that the end of said arbor will contact against said dial plate, which thereby will limit the outward axial movement of said arbor and hold the arbor in its bearing.

In this way there is devised a manner of mounting the parts such as to present a freely suspended arbor having a minimum amount of friction within its bearing and also presenting an improved manner of assembling the pointer and arbor within the case 1. The pointer is offset at the point 16 and this offset portion is formed with a slot 17 which permits of the use of a uniformly graduated scale on the dial, the change in leverage compensating for the movement of the Bourdon tube. This slot 17 is preferably inclined to the longitudinal axis of the pointer, which facilitates the calibration of the indicator and forms a desirable way of adapting the pointer mechanism to Bourdon tubes of various lengths.

The connecting rod or arm 18 is secured at one end to the free end of the tube 3 and the free end of the arm 18 is formed with a wrist pin 19 which is capable of being inserted within said slot 17 and this pin 19 projects far enough beyond the offset portion 16 to enable the pointer and arbor to have the necessary axial movement without disconnecting the pointer from the connecting rod 18. This arm 18 is preferably bendable, so that by means of the slot and bendable arm the indicating pointer can be readily calibrated to indicate the pressure properly on the dial plate. The dial plate is slotted at 20, and the slot can be formed of such length that one end of the slot will form a stop for the zero position of the pointer. As heretofore stated, the inclined slot 17 and pin 19 form adjustable means for adapting the pointer mechanism to Bourdon tubes of different lengths, and the arm 18 may be bent to occupy a position below the seat 7 and this bending of the arm is also advantageous in calibrating the instrument, and the danger of excessive friction due to the arbor being lifted out of normal position by the arm 18 and tube 3 is eliminated because the requisite amount of axial movement of the arbor is provided for by reason of the relative arrangement of arbor, bearing the dial plate as heretofore fully set forth.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. In a pressure gauge of the type depending on a Bourdon tube for the pressure transmitting mechanism the combination of a coupler having a journal bearing therein, an arbor fitting within a part of said bearing, leaving a part of said bearing projecting beyond the end of the arbor, a pointer secured to the arbor, a stop on said arbor for holding the arbor in position within said bearing and a dial plate forming another stop for said arbor.

2. In an instrument of the character specified the combination of a pointer with an arbor secured thereto, supporting means having a bearing for said arbor, a dial plate adjacent one end of said arbor, the end of said arbor being normally out of contact with said dial plate but adapted to contact therewith upon axial movement of said arbor in said bearing thereby to limit such axial movement of said arbor.

3. In an instrument of the character specified the combination of a pointer having a slotted offset portion, a rod with a wrist pin formed thereon, said wrist pin projecting within said slot and having the surface thereof bearing against a wall of said slot, a Bourdon tube connected to said rod, an arbor secured to said pointer, supporting means for said tube having a bearing for said arbor and a stop for the end of said arbor to limit the axial movement thereof in said bearing.

4. A pressure gauge comprising a casing, a post projecting through said casing and detachably secured thereto, said post being provided with a socket and an integral externally threaded nipple, there being an aperture in one side of said post in communication with the bore of said nipple, a tubular spring sector having an open end secured to said post in communication with said aperture and a closed free end, an index hand provided with a hub, means whereby said hub is pivotally mounted in the socket in said post, a unitary connection between said closed free end and said index hand, said index hand comprising a pair of parallel relatively offset portions, a dial, means whereby said dial is secured to said post so as to be adapted to contact with an element of said hand-pivoting means to maintain the pivot thereof in said socket.

In witness whereof, I hereunto subscribe my name.

CHARLES J. MANUEL.